(12) United States Patent
Zhang

(10) Patent No.: US 8,593,403 B2
(45) Date of Patent: Nov. 26, 2013

(54) POINTING STICK DEVICE

(75) Inventor: Wei Zhang, Camarillo, CA (US)

(73) Assignee: Sprintek Corporation

( * ) Notice: Subject to any disclaimer, the term of this patent is extended or adjusted under 35 U.S.C. 154(b) by 1058 days.

(21) Appl. No.: 12/157,812

(22) Filed: Jun. 13, 2008

(65) Prior Publication Data

US 2009/0309832 A1    Dec. 17, 2009

(51) Int. Cl.
*G06F 3/033* (2013.01)

(52) U.S. Cl.
USPC .......................... 345/161; 345/156; 345/157

(58) Field of Classification Search
USPC ....................... 345/156–157, 159–161, 163
See application file for complete search history.

(56) References Cited

U.S. PATENT DOCUMENTS

| | | | | |
|---|---|---|---|---|
| 5,374,787 A * | 12/1994 | Miller et al. | ............... | 178/18.06 |
| 5,495,077 A * | 2/1996 | Miller et al. | ............... | 178/18.06 |
| 5,680,154 A * | 10/1997 | Shiga et al. | ................... | 345/157 |
| 5,689,285 A * | 11/1997 | Asher | ............................. | 345/161 |
| 5,854,622 A * | 12/1998 | Brannon | ........................ | 345/161 |
| 5,874,938 A * | 2/1999 | Marten | ......................... | 345/156 |
| 5,966,117 A * | 10/1999 | Seffernick et al. | ............. | 345/161 |
| 6,175,359 B1 * | 1/2001 | Marten | ......................... | 345/161 |
| 6,243,077 B1 * | 6/2001 | Manara et al. | ................. | 345/157 |
| 6,331,849 B1 * | 12/2001 | VandenBoom | ................ | 345/161 |
| 6,429,850 B2 * | 8/2002 | Marten | ......................... | 345/161 |
| 6,486,871 B1 * | 11/2002 | Marten | ......................... | 345/157 |
| 7,443,379 B2 * | 10/2008 | Inamura et al. | ................ | 345/156 |
| 7,692,631 B2 * | 4/2010 | Inokuchi et al. | .............. | 345/161 |
| 2002/0126091 A1 * | 9/2002 | Rosenberg et al. | ............ | 345/161 |
| 2002/0171629 A1 * | 11/2002 | Archibald et al. | ............ | 345/157 |

* cited by examiner

*Primary Examiner* — Jason Mandeville
(74) *Attorney, Agent, or Firm* — David & Raymond

(57) ABSTRACT

The present invention provides a pointing stick device circuit which is using fewer components. The circuit is using current sources instead of voltage sources. This will be more convenient to integrate the circuit and largely reduce the cost. Also, using this circuit and the relative process, the requirement of high quality and low tolerance of some critical components is reduced. The performance of the device is improved.

15 Claims, 5 Drawing Sheets

POINTING STICK DEVICE

BACKGROUND OF THE PRESENT INVENTION

1. Field of Invention

The present invention relates to a method and apparatus of pointing stick device, and more particularly to a method and apparatus of pointing stick device using in compact electronics devices with reduced cost.

2. Description of Related Arts

A pointing stick device is first used in laptop computer for controlling the movement and position of the cursor. Most of pointing stick devices is also known as isometric joysticks because they are operated by sensing applied forces through two or more pairs of resistive strain gauges. Generally a pointing stick device includes a cantilever, and two pairs of strain gauges coupled with the cantilever. When the cantilever is exerted with force and generates deformation, the strain gauges will sense it and generate electronic signal. Then this signal can be used to control other devices such as a cursor.

The advantage of a pointing stick device is it can be operated by one finger, and this finger doesn't need to be moved away from the pointing stick. But in order to sense the force exerted by the finger which is normally very weak, the pointing stick device needs to be very sensitive. For this reason, the tolerance of the components is very low. For example, the current available products highly depend on accurate voltage sources cooperating with resistors as power resource and reference voltage. The current source is conveniently provided by many integrated chips such as micro controller unit (MCU), and is programmable. Doesn't like current source, voltage source needs extra separate to provide particular voltage level, and the voltage level is not adjustable. The precision is anther important issue. For acceptable performance, the precision of the sensors (strain gauges) is requested to be less than 2~3% which is expensive. This increases the cost, part count, and device space.

Device space is always highly considered in compact electronic equipment. The more external components are used, the more space is taken. Current products are using more than 30 external components which have a large edge to reduce. Another issue of compact electronic equipment is radio frequency noise. As the dimension of the circuit is getting smaller and smaller, electric magnetic interference, such as cell phone signal, is much easier to be introduced. The effect is magnificent especially for sensitive devices. The common solution is using different kinds of filters. But it is obvious that using filters will increase the cost, and make the system more complex. Besides these considerations, there is always an attempt for the device to perform faster and more accurate. Therefore, both the circuit and the operation process are necessary to be improved for a better performance.

SUMMARY OF THE PRESENT INVENTION

A main object of the present invention is to provide a pointing stick device circuit which reduces the cost.

Another object of the present invention is to provide a pointing stick device circuit with reduced discrete components.

Another object of the present invention is to lower the requirement of the quality and precision of the components used in the pointing stick device.

Another object of the present invention is to provide a pointing stick device reducing the radio frequency disturbing.

Another object of the present invention is to provide a method of pointing stick device to improve the performance.

Accordingly, in order to accomplish the above objects, the present invention provides a pointing stick device circuit, comprising:

a signal source element which comprises a plurality of strain gauges for sensing forces exerted onto the pointing stick and generating voltage signals;

a voltage approaching element providing an incremental voltage for comparing with the voltage signal generated by the signal source, wherein the voltage approaching element further comprises a first approaching unit and a second approaching unit; and a signal process element counting the time for the incremental voltage to approach the level of the voltage signals and calculating the forces exerted onto the pointing stick.

Moreover, the present invention also provides a method of a pointing stick device for sensing the force exerted whereon, comprising the steps of:

(a) resetting a circuit of said pointing stick device;

(b) sampling a signal source from said circuit;

(c) increasing an incremental voltage via a first approaching unit to a predetermined voltage level;

(d) linearly increasing said incremental voltage via a second approaching unit at a predetermined linear incremental rate;

(e) comparing said voltage signal of said sampled signal source with said incremental voltage from said second approaching unit; and (f) determining a time for said incremental voltage in responsive to said incremental rate thereof for calculating said force exerted onto said pointing stick device.

These and other objectives, features, and advantages of the present invention will become apparent from the following detailed description, the accompanying drawings, and the appended claims.

DETAILED DESCRIPTION OF THE PREFERRED EMBODIMENT

Figure 1:
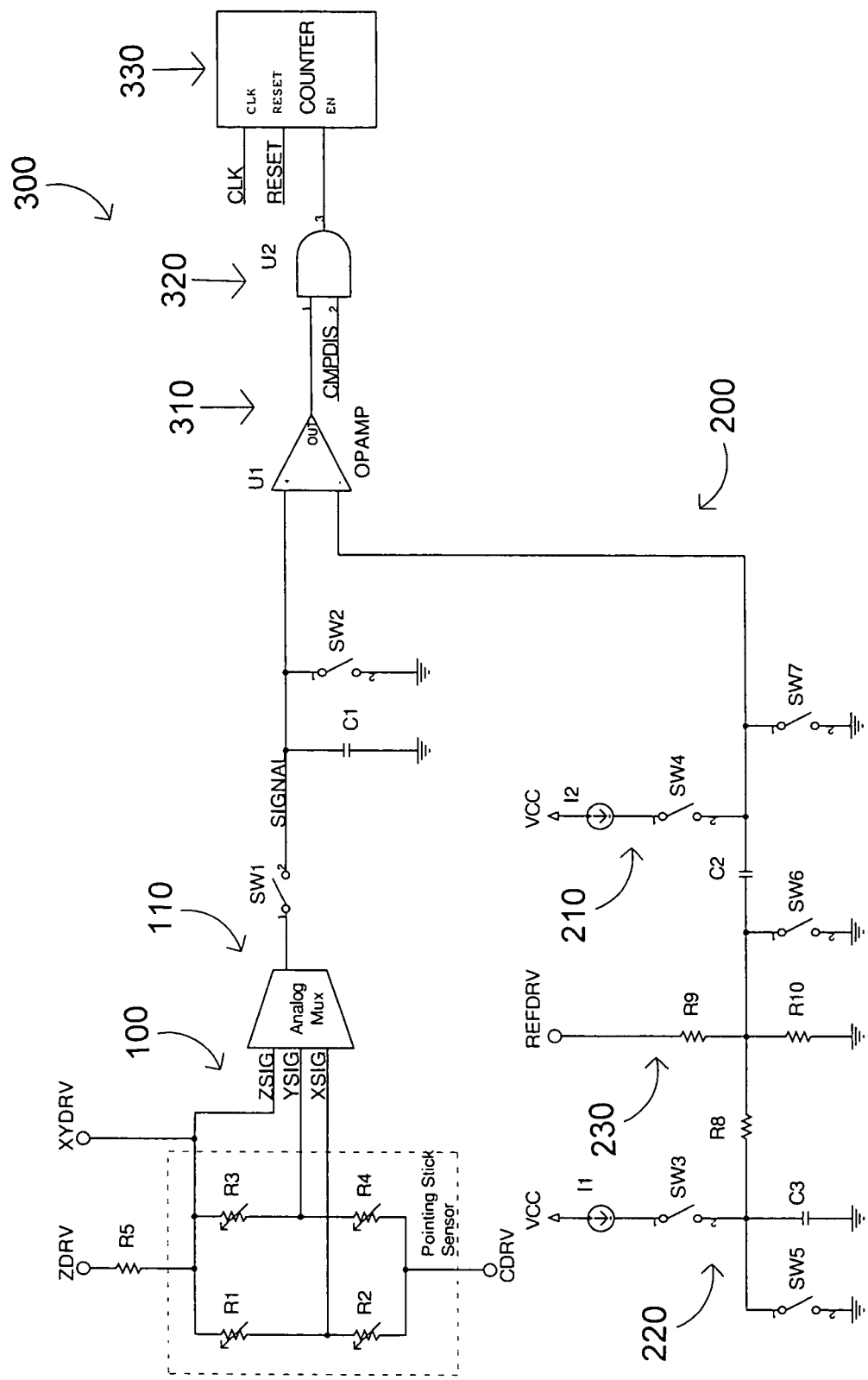
FIG. 1 is a circuit diagram of the pointing stick device according to the present invention.

Referring to FIG. 1 of the drawings according to the present invention, a pointing stick device comprises a signal source element 100, a voltage approaching element 200, and a signal process element 300. The signal source element 100 comprises three sensors sensing the forces exerted on the x, y, and z axes respectively. As in FIG. 1, the strain gauges R1 and R2 are coupled in serial for sensing the x axis, the strain gauges R3 and R4 are couple in serial for sensing the y axis. The R1, R2, and the R3, R4 are coupled in parallel and then are connected with the resistor R5 in serial for sensing the z axis. These voltage division circuits can tell the change of the resistance of the strain gauges which is caused by force exerted on the pointing stick device. The change of the voltage signals is generally in milli-volt level. The three signals are input into an analog multiplexer 110. The analog multiplexer 110 can select one signal once to pass through for further processing. The output of the analog multiplexer 110 is controlled by a switch SW1 to be connected with the next element.

Referring to FIG. 1, in a preferred embodiment of the present invention, the output of the multiplexer is connected with a sampling capacitor C1. The other electrode of the sampling capacitor C1 is connected with ground. So when one voltage signal is selected to pass through the multiplexer and the switch SW1 is closed, the voltage signal will charge the sampling capacitor C1 until the voltage level is the same as the voltage signal. Then the signal is sampled by the sampling capacitor C1. The electrode of the sampling capacitor C1 is also connected with ground through a switch SW2. When the switch SW2 is closed, the sampling capacitor C1 will be discharged.

The voltage approaching element 200 includes a first approaching unit 210, a second approaching unit 220, and a voltage division circuit 230. Referring to FIG. 1, in a preferred embodiment, the first and second approaching units are charged by two current sources to approach to the voltage level of the signal. It is worth to mention, since the two current sources are used respectively, referring to FIG. 5, in a real circuit, they can be shared through one analog multiplexer. It is because the current source is programmable to provide different value. In this manner, some elements are saved.

The first approaching unit comprises a first approaching capacitor C2. One electrode of the first approaching capacitor C2 is connected with the ground through a switch SW6. The other electrode of the first approaching capacitor C2 is connected with a first current source through a switch SW4. When the switch SW4 is closed in a predetermined period of time, the capacitor will be charge to a predetermine voltage level. This voltage level is close but lower than the voltage level of the signals. This electrode is also connected with ground through a switch SW7 for discharging when the switch SW7 is closed.

The second approaching unit comprises a second approaching capacitor C3. One electrode of the second approaching capacitor C3 is connected with the ground. The other electrode of the second approaching capacitor C3 is connected with a second current source through a switch SW3. When the switch SW3 is closed, the second approaching capacitor C3 is being charged, and the voltage of the capacitor is lift linearly with a predetermined rate.

The voltage division circuit comprises three resistors R8, R9, and R10, and a reference voltage. The three resistors are connected in one junction and then further connected with one electrode of the first approaching capacitor. Resistor R9 is also connected with the reference voltage. The resistor R10 is also connected with ground. The resistor R8 is also connected with one electrode of the second approaching capacitor C3. The voltage division circuit is arranged in such a manner that when the switch SW5 is closed and switch SW6 is open, the voltage division circuit will lift the voltage of the first approaching capacitor C3 close to the signal sample in the sampling capacitor C1 and slightly lower. When both of the switches SW5 and SW6 are open, the voltage of the second approaching capacitor C3 is added to the first approaching capacitor C2 as the voltage output of the voltage approaching element 200, and this voltage will be increased linearly as well as the second approaching capacitor C3.

The signal process element 300 comprises a comparator 310, a logic gate 320, and a counter 330. Referring to FIG. 1, in the preferred embodiment of the present invention, the voltage output of the sampling capacitor C1 is connected with the non-inverting input (V+) of the comparator; the voltage output of the voltage approaching element 200 is connected with the inverting input (V−) of the comparator. The logic gate is an AND gate. One input of the logic gate is connected with the output of the comparator; the other input of the logic gate is connected with a control signal. The output of the logic gate is connected with the counter. When the output of the comparator is high, and the control signal is high at the same time, the output of the logic gate is high. The counter can count the time during the output of the logic gate is high.

Figure 3:
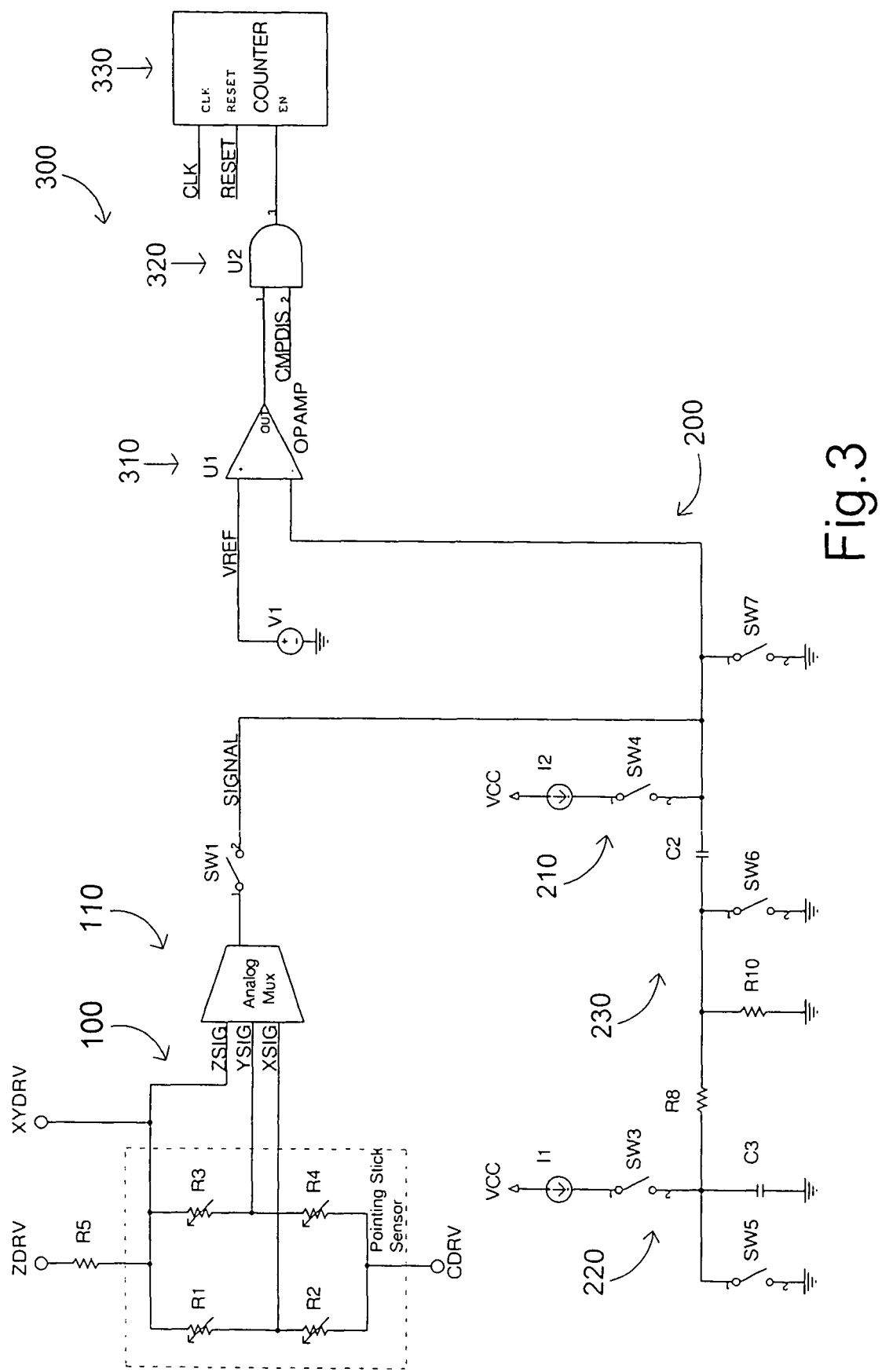
FIG. 3 is a circuit diagram of an alternative embodiment of the present invention.

FIG. 3 is a circuit diagram of an alternative embodiment of the present invention. In this embodiment, a referent voltage is connected with the non-inverting input (V+) of the comparator. The output of the analog multiplexer is directly coupled with the output of the voltage approaching element. The signal voltage is added with the voltage output of the voltage approaching element and input into the inverting input (V−) of the comparator. In this way, the counter counts the time for the sum of the voltage output of the signal source element and the voltage approaching element to approach the referent voltage. The value of the voltage signal can still be calculated. The force exerted on the pointing stick device can be known.

Figure 4:
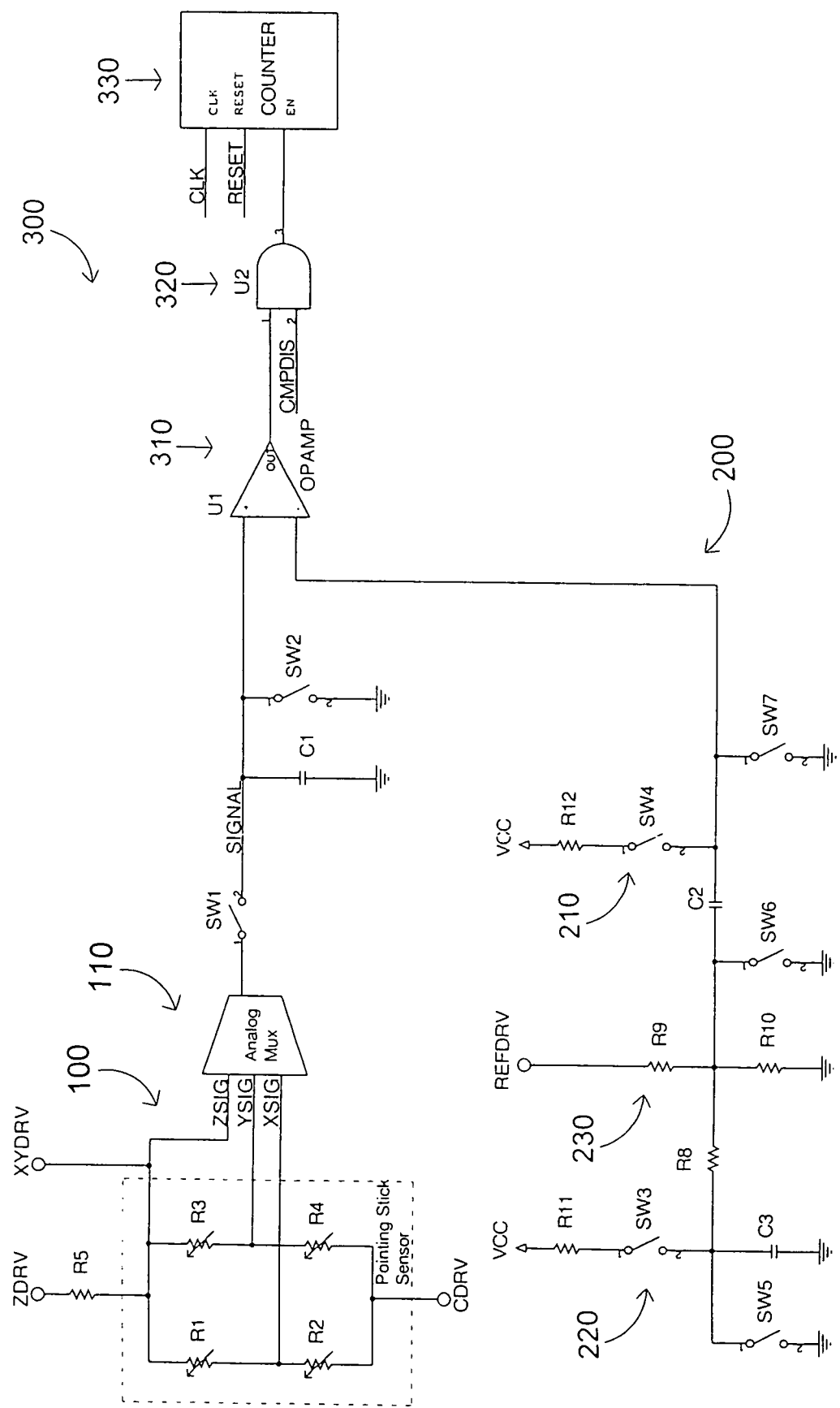
FIG. 4 is a circuit diagram of another alternative embodiment of the present invention.

In this present invention, the current source can be replaced by a voltage source coupled with a resistor. FIG. 4 is a circuit diagram of an alternative embodiment of the present invention. In this embodiment, the first current source is replaced by a voltage source coupled with a resistor. The second current source is also replaced by a voltage source coupled with a resistor. In this embodiment, the present invention can also use voltage source and resistor to provide charging current, but this circuit needs more extra components, and the tolerance of some components is much smaller.

Figure 2:
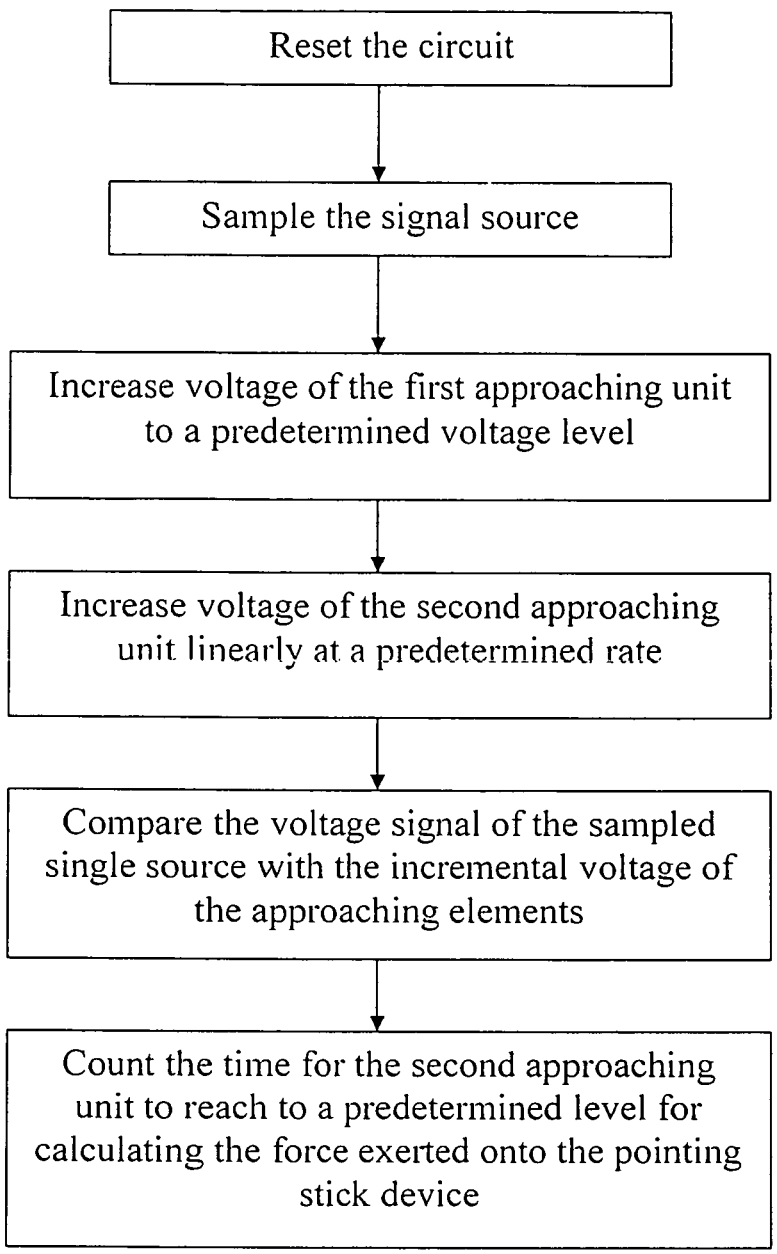
FIG. 2 is a flow chart of the method of a pointing stick device for sensing the exerted force.

Referring to FIG. 2, the pointing stick device is working in this process:

At first the device is set in idle state. The current sources and the voltage sources are disconnected. The switches SW3 and SW4 are open; the switches SW1, SW2, SW5, SW6 and SW7 are closed to discharge the capacitors. The counter is reset. The control signal is set to low. Connect the voltage source with the signal source element 100. The sensors (strain gauges) are sensing the forces and transform into voltage signals. These signals include signals of x, y, and z axes respectively. The analog multiplexer 110 then selects one signal to pass through and the switch SW2 is open. Each time only one signal is selected. As the switch SW1 is closed and switch SW2 is open, the sampling capacitor C1 is charged by the voltage signal. In a predetermined period of time the voltage of the sampling capacitor C1 is the same as the voltage signal. Then the switch SW1 is opened.

After the voltage signal is sampled, the switch SW7 is opened and the switch SW4 is closed for a predetermined period of time. The first current source is then connected with the first approaching capacitor C2 and charges the capacitor C2 to an expected level. Then the switches SW4 and SW6 are open, and the reference voltage is connected with the voltage division circuit. As a result the voltage of the voltage approaching element 200 is lifted close to the voltage signal but a slightly lower as determined. This is the step of coarse approaching.

At this moment, the output of the voltage approaching element 200 is lower than the output of the signal source element 100, the output of the comparator is high. Set the control signal to high, the output of the logic gate is high, and the counter starts to count. At the same time, the switch SW5 is open, and the switch SW3 is closed. The second current source is connected with the second approaching capacitor C3 and starts to charge the second approaching capacitor C3 linearly. The voltage of the second approaching capacitor C3 is added to the voltage output of the voltage approaching element 200 through the voltage division circuit. So the voltage output of the voltage approaching element 200 is increasing linearly to approach the voltage signal.

When the voltage output of the voltage approaching element 200 is equal to the output of the signal voltage source element, the output of the comparator turns to low, then the counter stops counting. The counted time is then used to calculate the value of the voltage signal. Consequently, the force exerted on the pointing stick device is known. The results are sent to the next processor for further processing.

In the next loop, another signal will be selected to be sensed with the same process. So the three signals can be sensed in a predetermined sequence.

Figure 5:
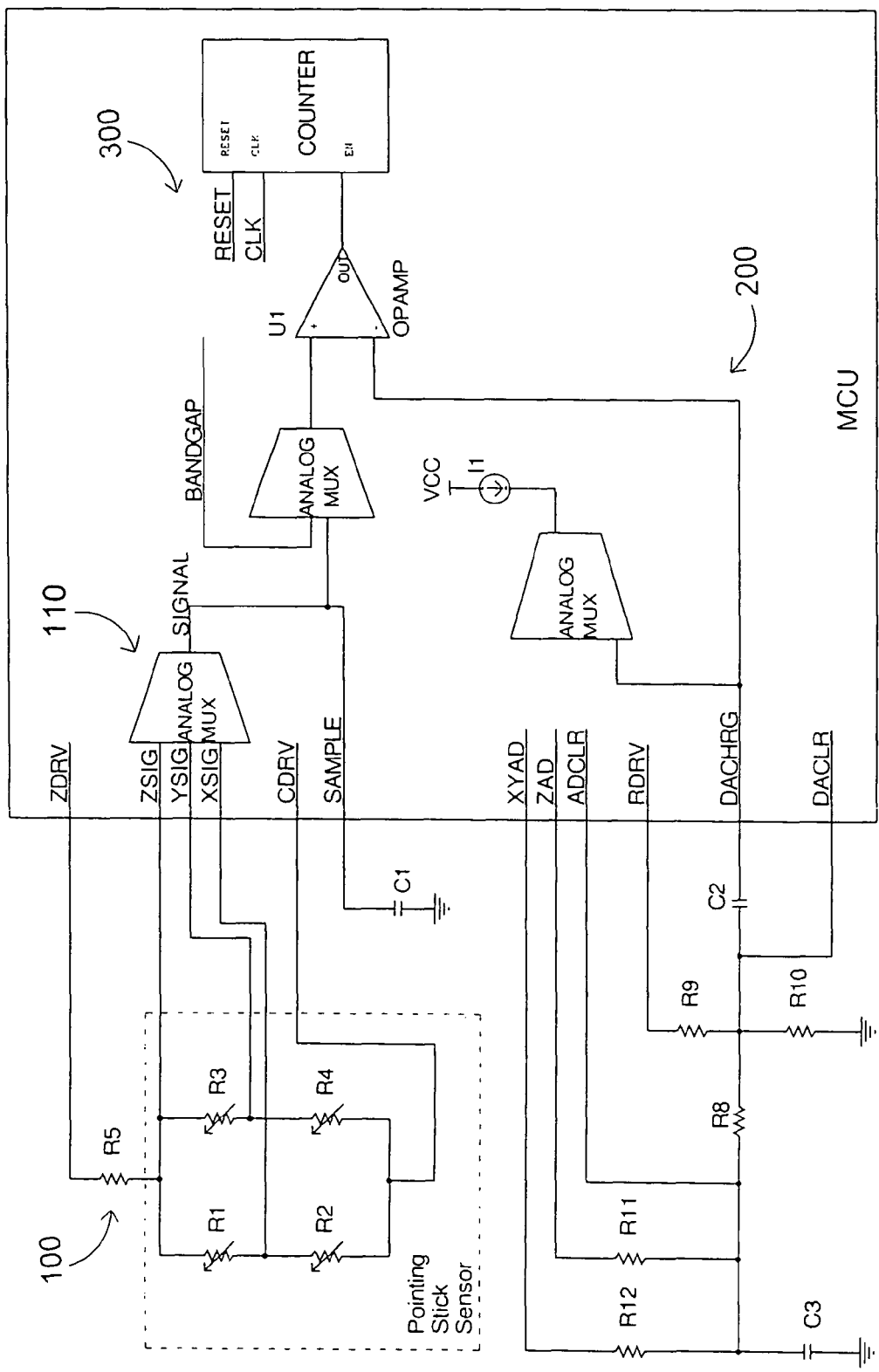
FIG. 5 is a schematic diagram of the integrated circuit.

In summary, the present invention provides a pointing stick device circuit which is using fewer components. The circuit is using current sources instead of voltage sources. In order to change the voltage level of a voltage source, the arrangement of the resistors has to be changed. Current source is programmable, the output level doesn't rely on any resistors. Since the output of a current source can be easily changed, one current source is able to be shared. This will be more convenient to integrate the circuit and largely reduce the cost. FIG. 5 illustrates an integrated chip with limited discrete elements to perform the function. Also, using this circuit and the relative process, the requirement of high quality and low tolerance of some critical components is reduced. The performance of the device is improved.

It is worth mentioning, in this design, the requirement of high quality and low tolerance of some critical components is reduced. Referring to FIG. 1, in order to accurately measure the force, the tolerance of the strain gauges is requested to be less than 2% in prior art. The tolerance of the strain gauges can be larger than 10%. In the present invention, because the first approaching unit does the coarse approaching and can adjust the error introduced by the inaccuracy of the resistors, the tolerance of the strain gauges can be allowed to 20%. In this circumstance, low cost components can be selected without affecting the same performance of the device.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A pointing stick device, comprising:
a signal source element which comprises a plurality of strain gauges for sensing forces exerted onto a pointing stick and generating voltage signals;
a voltage approaching element providing an incremental voltage for comparing with said voltage signals generated by said signal source element, wherein said voltage approaching element comprises a voltage division circuit providing a predetermined voltage to said incremental voltage according to said strain gauges of said signal source element, a first approaching unit lifting said incremental voltage close to said voltage signals such that said incremental voltage is lifted not to exceed said voltage signals, and a second approaching unit lifting said incremental voltage linearly, wherein said first approaching unit comprises a first current source, a first approaching capacitor, and a first switch for coarse approaching and for adjusting an error introduced by an inaccuracy of resistors, wherein said first approaching capacitor is connected with said first current source through said first switch, wherein when said first switch is closed in a predetermined period of time, said first approaching capacitor is charged to a predetermined voltage level, wherein said second approaching unit comprises a second current source, a second approaching capacitor, and a second switch, wherein said second approaching capacitor is connected with said second current source through said second switch, wherein when said second switch is closed, said second approaching capacitor is being charged while said incremental voltage is lifted linearly with a predetermined rate, wherein said first and second current sources are programmable to provide different values; and
a signal process element comparing said voltage signals of said signal source element and said incremental voltage of said voltage approaching element, and counting the time for said incremental voltage to reach to a level related to said voltage signals for calculating said forces exerted onto said pointing stick.

2. The device, as recited in claim 1, wherein said first current source charges, said first approaching capacitor for the predetermined period of time when said first switch is closed to increase said voltage level of said first approaching unit to said predetermined level.

3. The device, as recited in claim 2, wherein said second current source charges said second approaching capacitor when said second switch is closed to increase said voltage level of said second approaching unit linearly with the predetermined rate.

4. The device, as recited in claim 1, wherein said first approaching unit adjusts an error voltage of said voltage division circuit caused by a tolerance of said strain gauges.

5. The device, as recited in claim 3, wherein said first approaching unit adjusts an error voltage of said voltage division circuit caused by a tolerance of said strain gauges.

6. The device, as recited in claim 1, wherein said signal process element further comprises a comparator comparing said voltage signal with said incremental voltage and a counter counting the time for said incremental voltage to reach to said level related to said voltage signals.

7. The device, as recited in claim 3, wherein said signal process element further comprises a comparator comparing said voltage signal with said incremental voltage and a counter counting the time for said incremental voltage to reach to said level related to said voltage signals.

8. The device, as recited in claim 5, wherein said signal process element further comprises a comparator comparing said voltage signal with said incremental voltage and a counter counting the time for said incremental voltage to reach to said level related to said voltage signals.

9. A method of sensing forces exerted on a pointing stick device, comprising the steps of:
(a) resetting a circuit of said pointing stick device;
(b) sampling a signal source from said circuit;
(c) increasing an incremental voltage via a first approaching unit to a predetermined voltage level, wherein said first approaching unit comprises a first current source, a first approaching capacitor, and a first switch for coarse approaching and for adjusting an error introduced by an inaccuracy of resistors, wherein said first approaching capacitor is connected with said first current source through said first switch, wherein when said first switch is closed in a predetermined period of time, said first approaching capacitor is charged to a predetermined voltage level;

(d) linearly increasing said incremental voltage via a second approaching unit at a predetermined linear incremental rate, wherein said second approaching unit comprises a second current source, a second approaching capacitor, and a second switch, wherein said second approaching capacitor is connected with said second current source through said second switch, wherein when said second switch is closed, said second approaching capacitor is being charged while said incremental voltage is lifted linearly with a predetermined rate, wherein said first and second current sources are programmable to provide different values;

(e) comparing said voltage signal of said sampled signal source with said incremental voltage from said second approaching unit; and (f) determining a time for said incremental voltage in responsive to said incremental rate thereof for calculating said force exerted onto said pointing stick device.

10. The method, as recited in claim 9, wherein, in step (c) further comprises steps: (c1) connecting with a voltage division circuit; and (c2) charging said first approaching capacitor by said first current source for the predetermined period of time when said first switch is closed in order to increase said incremental voltage to reach said voltage level.

11. The method, as recited in claim 10, wherein, in step (d) further comprises a step: (d1) linearly charging said second approaching capacitor by said second current source when said second switch is closed in order to linearly increase said incremental voltage.

12. The method as recited in claim 9 wherein, in the step (f), said time is determined by said incremental voltage linearly increased at said incremental rate to reach said voltage signal.

13. The method as recited in claim 11 wherein, in the step (f), said time is determined by said incremental voltage linearly increased at said incremental rate to reach said voltage signal.

14. The method as recited in claim 9 wherein, in the step (e) a comparator compares the sum voltage of said voltage signal and said incremental voltage with a referent voltage, wherein in the step (f) said time is determined by said incremental voltage linearly increased at said incremental rate to reach said voltage signal.

15. The method as recited in claim 13 wherein, in the step (e) a comparator compares the sum voltage of said voltage signal and said incremental voltage with a referent voltage, wherein in the step (f) said time is determined by said incremental voltage linearly increased at said incremental rate to reach said voltage signal.

* * * * *